3,051,768
ELECTRIC BATTERY AND BATTERY
ELECTROLYTE
Eric F. Kujas, Philadelphia, Pa., assignor to The Electric
Storage Battery Company, a corporation of New Jersey
No Drawing. Filed Oct. 13, 1958, Ser. No. 766,718
10 Claims. (Cl. 136—24)

The present invention generally relates to alkaline electro-chemical systems of the type utilizing nickel-cadmium electrodes. More specifically, the present invention is concerned with a new and improved electrolyte particularly adapted for use in nickel-cadmium cells and in counter E.M.F. cells of the type utilizing negative electrodes of cadmium or porous nickel.

A general object of the present invention is to provide a new and improved electrolyte for use in cells of the type described which are particularly adapted to facilitate operation in the sealed condition.

It is known in the prior art that under certain conditions nickel-cadmium cells and certain types of counter cells can be operated in a sealed container without an undue build-up of gas pressure within the container by properly proportioning the electro-chemical capacities of the electrodes with respect to each other and by operating the cell with a limited amount of electrolyte, the latter being contained substantially within the pores of an absorbent separator and within the pores of the electrodes themselves. The theory of operation of a sealed cell with limited amounts of electrolyte is that by limiting the amount of electrolyte to that necessary for ion transfer between the electrodes and to that amount necessary to provide a thin film covering the electrode pore walls, to maintain them highly chemically active, the effective surface of the electrodes is more readily available for direct combination with the gases liberated during cell operation. In this manner, there is maintained within the cell a balanced system which provides for gas recombination at a rate which prevents an undue build-up of gas pressure within the cell. While sealed cells of the type described have proved to be satisfactory for certain applications, they are only adapted for operation on continuous overcharge at low rates and generally have a lower capacity and shorter life then comparable unsealed batteries.

It is, therefore, another object of the present invention to provide a new and improved electrolyte for a nickel-cadmium battery which will increase the capacity and life of a sealed battery.

A further object of the present invention is to provide an electrolyte for a nickel-cadmium battery which will permit a sealed battery to be operated on continuous overcharge at high rates without an undue build-up of gas pressure.

In the manufacture of sealed nickel-cadmium batteries with limited electrolyte, it is general practice to invert the cells as they approach full charge on formation to remove excess electrolyte and then to continue the charging in the inverted position to arrive at a critical optimum electrolyte content. This is an expensive and time consuming process.

It is, accordingly, a further object of the present invention to provide an electrolyte for a nickel-cadmium battery which will permit the battery to be sealed with a non-critical amount of electrolyte therein and, thereby, eliminate the so-called "inverted charge" heretofore necessary in the manufacture of such cells.

In accordance with the present invention, there is provided an electrolyte comprising a dilute solution of an alkali hydroxide such as potassium hydroxide or sodium hydroxide having present therein halogen ions selected from the group consisting of chlorine, bromine, and fluorine in concentrations ranging from 1 to 10 molar percent by weight of the electrolyte. While cells may be formed in electrolyte of the present invention, it has been found preferable that they be formed in a conventional electrolyte in order to develop more efficiently the capacity of the cells. After formation, the formation electrolyte may then be exchanged by the electrolyte of the present invention. Halogen ions may be introduced into the alkaline solutions by the addition thereto of appropriate halogen salts or by the addition of aqueous halogen salt solutions. In this respect, it should be noted that by the use of the word halogen above and elsewhere in this specification is meant only the halogen of the group noted above, namely, chlorine, bromine and fluorine.

While the mechanism which makes possible the successful operation of a sealed nickel-cadmium cell with a non-critical amount of the electrolyte of the present invention is not fully understood, it may be partly explained by the establishment within the cell of a halogen cycle in preference to the establishment of the normal oxygen cycle. If such a cycle is established, halogen ions are oxidized at the positive electrode and reduced at the negative electrode after the battery is fully charged. Since the oxidation potentials of certain of the halogen ions produced during cell operation are higher than those of oxygen, it is obvious that, in these cases, oxygen evolution is not completely suppressed. It is felt, however, that, since the halogen ions in general are considerably more soluble in electrolyte than oxygen, that the transfer of halogen ions through the electrolyte will proceed at a rate which provides the dominant oxidation reduction reaction within the sealed cells.

Other objects and advantages of the present invention will be readily apparent from the following detailed description of preferred embodiments thereof.

*Example 1*

In carrying out one form of the present invention, an electrolyte is prepared by mixing together the following materials: 100 grams of potassium chloride, 100 grams of potassium hydroxide, and 400 grams of water. The molar composition of this electrolyte is potassium chloride—5.2%, potassium hydroxide—7.0%, and water—87.8%. This electrolyte has a specific gravity of 1.210.

Following the formation of a nickel-cadmium cell, the formation electrolyte was drained, replaced by the electrolyte described above, the excess electrolyte drained off and the cell sealed. The cell was then operated on continuous overcharge at a high rate without any substantial build-up of pressure within the cell container. In addition, the cell exhibited an increased capacity.

One possible explanation for the function of the chloride ion in permitting a nickel-cadmium cell to be sealed with non-critical amounts of electrolyte therein can be seen by considering the following potentials of electrolyte reactions listed below:

Cadmium electrode _____ $E = 0.809$ volt
Nickel electrode _____ $E = +0.490$ volt $$Cl^- + 2(OH)^- \rightarrow ClO^- + H_2O + 2e \quad E = +0.89$$
$$ClO^- + 2(OH)^- \rightarrow ClO_2^- + H_2O + 2e \quad E = +0.66$$
$$ClO_2^- + 2(OH)^- \rightarrow ClO_3^- + H_2O + 2e \quad E = +0.33$$
$$ClO_3^- + 2(OH)^- \rightarrow ClO_4^- + H_2O + 2e \quad E = +0.36$$

The chloride ion is stable against the cadmium electrode, however, it is oxidized at the positive electrode under conditions of overcharge to hypo-chlorate or chlorate ions. These ions are reduced again at the cadmium electrode to chloride ions. Thus, by the addition of chloride ions to the electrolyte, a chlorate cycle can be established within a cell, making it possible to operate the cell in a sealed condition. It should be noted, however, that the oxidation to ClO⁻ requires a potential higher than the oxygen evolution potential, accordingly, oxygen evolution is not completely inhibited. However, the ClO⁻ ion is easily oxidized to $ClO_2^-$ and $ClO_3^-$ and, in addition, is considerably more soluble in the electrolyte than oxygen and transfers through the electrolyte at a greater rate. As a result, while oxygen evolution is not completely inhibited, it is reduced to such an extent that, with the establishment of a chlorate cycle within a cell, there is no substantial pressure built up within the cell on overcharge. Still further, on open circuit, there is no oxidation of Cl⁻ and a cell will not show any excess stand loss.

In addition to potassium chloride, other chloride salts such as sodium chloride, lithium chloride, magnesium chloride or any soluble chloride salt having anions compatible with cell operation may be utilized to supply the chloride ions in the electrolyte of the present invention. It will be obvious to those skilled in the art that chlorate salts can also be utilized at an adverse cost. Still further, it has been found that the molar composition of the electrolyte solution may be varied with a chloride salt being present in concentrations ranging from about 1 to 10% by weight of the electrolyte. Optimum performance, however, has been obtained with solutions having molar chloride salt concentrations of from about 4 to 6%.

*Example 2*

In carrying out another form of the present invention, an electrolyte is prepared by mixing together the following materials: 100 grams of potassium bromide, 100 grams of potassium hydroxide, and 400 grams of water. The molar composition of this electrolyte is potassium bromide—3.4%, potassium hydroxide—7.2%, and water—89.4%. This electrolyte has a specific gravity of 1.211.

As in the case of the electrolyte containing chloride ions, this electrolyte containing bromide ions also permitted the sealed operation of nickel-cadmium cells on continuous overcharge at high rates without an undue build-up of pressure within the cell containers. One possible explanation for this can be seen by considering the following potentials of electrolyte reactions:

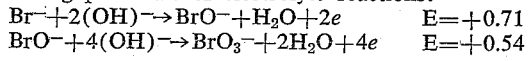

$Br^- + 2(OH)^- \rightarrow BrO^- + H_2O + 2e$     $E = +0.71$
$BrO^- + 4(OH)^- \rightarrow BrO_3^- + 2H_2O + 4e$     $E = +0.54$ The Br⁻ ion is stable on open circuit charge and discharge. On overcharge, however, BrO⁻ is formed which is easily oxidized to $BrO_3^-$. The $BrO_3^-$ ion is then reduced at the negative electrode and a bromide cycle established. Since the oxidation potential of Br⁻ is higher than the oxygen evolution potential, some oxygen will be evolved during overcharge. However, since bromide ions are more soluble in the electrolyte than oxygen and transfers through the electrolyte at a greater rate, oxygen evolution is slowed down. Since the oxidation potential for Br⁻ is lower than for Cl⁻, this electrolyte allows higher overcharge currents than chloride electrolytes. No excessive self-discharge can occur during open circuit since no new Br⁻ can be oxidized. Only the oxidized forms which are produced at the positive during overcharge will, as in the case of Cl⁻, be reduced at the negative electrode.

In addition to potassium bromide, other bromide salts such as sodium bromide, magnesium bromide or any other soluble salts having anions compatible with cell operation may be utilized as a source of bromide ion in the electrolyte of the present invention. Still further, it has been found that the molar composition of the embodiment of the present invention may be varied with a bromide salt being present in concentrations ranging from about 1 to 10% by weight of electrolyte. Optimum performance, however, has been obtained with solutions having molar bromide salt concentrations of from about 3 to 5%.

*Example 3*

In carrying out another form of the present invention, an electrolyte is prepared by mixing together the following materials: 100 grams of potassium fluoride, 100 grams of potassium hydroxide, and 400 grams of water. The molar composition of the electrolyte is potassium fluoride—6.9%, potassium hydroxide 6.9%, and water—86.2%.

As in the case of the electrolytes containing chloride and bromide ions, the electrolyte described above containing fluoride ions also permitted the sealed operation of nickel-cadmium cells on continuous overcharge at high rates without a substantial build-up of gas pressure within the cell containers. Theoretical considerations of the fluoride ion would lead to the belief that it is an unsatisfactory additive because the oxidation potentials of fluoride are much higher than those of oxygen. However, in practice, the contrary has been found to be true and cells having fluoride ions present in the electrolyte have given some of the most outstanding results in reducing gas pressure build-up and increasing cell capacity.

In addition to potassium fluoride, other fluoride salts, such as sodium fluoride or any other soluble fluoride salt having anions compatible with cell operations may be utilized to supply the fluoride ions in carrying out the form of the present invention described above. Still further, it has been found that the molar composition of the electrolyte solution may be varied with the fluoride salt being present in concentrations ranging from about 1 to 10% by weight of the electrolyte. Optimum performance, however, has been obtained with electrolytes having molar fluoride salt concentrations of from 6 to 8%.

While it might appear that the addition of salts of the halogens from the group consisting of chlorine, bromine, and fluorine would be harmful to the life and operation of a nickel-cadmium battery, based on classical experience with open pocket cells, the contrary appears to be true. Tests indicate that there is no harmful effect when the halogen ions are present in the electrolyte in the specified percentages even under the conditions of severe cycling. While the electrolyte of the present invention may be utilized for the initial formation of the electrodes without any harmful effects, it has been found preferable that electrodes be first formed in normal electrolyte to more efficiently develop the capacity of the electrodes. Following formation, the formation electrolyte may be then drained and replaced with the electrolyte of the present invention.

It will be obvious to those skilled in the art that while the specific examples of the electrolytes made in accordance with the present invention have been illustrated as utilizing potassium hydroxide as the alkali hydroxide, that any hydroxide of the alkali hydroxide group, such as sodium hydroxide, may be utilized in its place. In addition, the specific halogen salts mentioned hereinbefore for supplying the particular halogen ion desired in the electrolyte is also purely illustrative. Any halogen salts having anions which will not plate out or in any other way take part in the electro-chemical reaction within a cell or become metallic impurities on either electrode may be utilized. As a general class, the halogen salts of the alkali metals are acceptable for this purpose.

While the discussion hereinbefore has been primarily devoted to describing the electrolytes of the present invention as used in nickel-cadmium batteries, it will be obvious to those skilled in the art that the electrolytes described are also adapted for use in counter cells of the type utilizing negative electrodes of cadmium and porous nickel. As in the case of nickel-cadmium batteries, the electrolytes of the present invention are particularly adapted when utilized in counter cells of the type described above to facilitate sealed cell operation. When so utilized, these electrolytes will permit operation of the cells with excess amounts of electrolyte and thus, provide for a longer cell life and more effective dissipation of heat generated during cell operation. In counter cells, the electrolytes of the present invention are believed to function in the same manner as in nickel-cadmium batteries, that is to say, that there is established within the cell a cycle of the particular halogen utilized in preference to the normal oxygen evolution cycle.

Having described the present invention, that which is claimed as new is:

1. In a nickel-cadmium battery, an alkaline electrolyte containing a salt of a halogen selected from the group consisting of chlorine, bromine, and fluorine in an amount ranging from about 1 to 10 molar percent.

2. In a nickel-cadmium battery, an alkaline electrolyte containing a chloride salt in an amount ranging from about 4 to 6 molar percent.

3. In a nickel-cadmium battery, an alkaline electrolyte containing a bromide salt in an amount ranging from about 3 to 5 molar percent.

4. In a nickel-cadmium battery, an alkaline electrolyte containing a fluoride salt in an amount ranging from about 5 to 8 molar percent.

5. In a nickel-cadmium battery, an aqueous electrolyte composed substantially of 66.67% water, 16.66% potassium hydroxide, and 16.66% of a salt of a halogen selected from the group consisting of chlorine, bromine, and fluorine.

6. In a nickel-cadmium battery, an aqueous electrolyte composed substantially of 16.66% potassium chloride, 16.66% potassium hydroxide, and 66.67% water.

7. In a nickel-cadmium battery, an aqueous electrolyte composed substantially of 16.66% potassium bromide, 16.66% potassium hydroxide, and 66.67% water.

8. An aqueous electrolyte composed substantially of 16.66% potassium fluoride, 16.66% potassium hydroxide, and 66.67% water.

9. In a sealed nickel-cadmium battery, an electrolyte comprising a dilute solution of potassium hydroxide containing a potassium salt selected from the group consisting of potassium chloride, potassium bromide, and potassium fluoride, in an amount ranging from about 1 to 10 molar percent.

10. In a nickel-cadmium battery, an electrolyte comprising a dilute solution of an alkaline hydroxide selected from the group consisting of potassium hydroxide and sodium hydroxide, containing a soluble salt of a halogen selected from the group consisting of chlorine, bromine, and fluorine, in an amount ranging from about 3.4 to 6.9 molar percent.

References Cited in the file of this patent

UNITED STATES PATENTS

| | | |
|---|---|---|
| 358,111 | Fitzgerald | Feb. 22, 1887 |
| 512,567 | Stine | Jan. 9, 1894 |
| 2,919,216 | Corran | Dec. 29, 1959 |

FOREIGN PATENTS

| | | |
|---|---|---|
| 379,141 | Great Britain | Aug. 25, 1932 |